(12) United States Patent
Isono (10) Patent No.: US 8,001,836 B2
(45) Date of Patent: Aug. 23, 2011

(54) PEDAL OPERATION AMOUNT DETECTING APPARATUS

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 644 days.

(21) Appl. No.: 12/067,230

(22) PCT Filed: Nov. 12, 2007

(86) PCT No.: PCT/JP2007/071924
§ 371 (c)(1),
(2), (4) Date: Mar. 18, 2008

(87) PCT Pub. No.: WO2008/059793
PCT Pub. Date: May 22, 2008

(65) Prior Publication Data
US 2010/0192681 A1    Aug. 5, 2010

(30) Foreign Application Priority Data
Nov. 15, 2006   (JP) .................................. 2006-309645

(51) Int. Cl.
*G01M 17/00*   (2006.01)
(52) U.S. Cl. ......................................................... 73/132
(58) Field of Classification Search .................... 73/121, 73/128, 129, 132
See application file for complete search history.

(56) References Cited

U.S. PATENT DOCUMENTS

| | | | |
|---|---|---|---|
| 5,217,280 A * | 6/1993 | Nykerk et al. ..................... 303/3 |
| 5,563,355 A | 10/1996 | Pluta et al. | |
| 6,446,500 B1 * | 9/2002 | Marquardt et al. .............. 73/132 |
| 7,121,154 B2 * | 10/2006 | Saito et al. ............... 73/862.621 |
| 7,712,371 B2 * | 5/2010 | Fujiwara ......................... 73/774 |
| 2004/0238235 A1 * | 12/2004 | Saito et al. ..................... 177/225 |
| 2006/0162434 A1 * | 7/2006 | Saito et al. ....................... 73/132 |

FOREIGN PATENT DOCUMENTS

| | | |
|---|---|---|
| JP | 1-142817 | 9/1989 |
| JP | 10 329668 | 12/1998 |
| JP | 11 501883 | 2/1999 |
| JP | 11 255084 | 9/1999 |
| JP | 2000 168532 | 6/2000 |
| JP | 2001 18768 | 1/2001 |
| JP | 2001 39276 | 2/2001 |
| JP | 2006 71506 | 3/2006 |

* cited by examiner

Primary Examiner — Eric S McCall (74) Attorney, Agent, or Firm — Oblon, Spivak, McClelland, Maier & Neustadt, L.L.P.

(57) ABSTRACT

A pedal operation amount detecting apparatus detects a pedal operation amount based on a load applied by a rotating operation of an operating pedal between the operating pedal and a connecting shaft which rotatably connects the operating pedal and a connecting member connected at an end portion of an operating rod. The pedal operation amount detecting apparatus includes a load transfer member arranged between a connecting hole of the operating pedal and the connecting shaft and capable of transferring a load from the operating pedal to the connecting shaft, and a load detecting unit arranged on the load transfer member and capable of transferring the load from the operating pedal and of detecting a compressive load applied by a surface of the load transfer member and one of an inner circumferential surface of the connecting hole and an outer circumferential surface of the connecting shaft.

6 Claims, 7 Drawing Sheets

PEDAL OPERATION AMOUNT DETECTING APPARATUS

TECHNICAL FIELD

The present invention relates to a pedal operation amount detecting apparatus which detects a pedal operation amount based on a load applied by a rotating operation of an operating pedal between the operating pedal and a connecting shaft which rotatably connects the operating pedal to a connecting member connected to an end portion of an operating rod.

BACKGROUND ART

For example, an Electronically Controlled Brake (ECB) is known as a braking apparatus of a vehicle, in particular, as an electronically-controlled braking apparatus which electrically controls a braking force applied by the braking apparatus, i.e., a braking oil pressure supplied to a wheel cylinder that drives the braking apparatus, according to an operation amount (such as a pedal stroke and a tread force) input from a brake pedal.

The ECB stores oil pressure increased by a pump in an accumulator and supplies a regulated pressure as a braking oil pressure to the wheel cylinder according to a braking request of an operator. More specifically, when the operator treads on the brake pedal, a master cylinder generates an oil pressure corresponding to the operation amount of the brake pedal. At the same time, a fraction of an operating oil flows into a stroke simulator to regulate the operation amount of the brake pedal corresponding to the tread force of the brake pedal. On the other hand, a brake ECU sets a target decelerated speed of the vehicle according to the pedal stroke, determines distribution of braking forces to be applied to wheels, and supplies a predetermined oil pressure to each wheel cylinder from the accumulator.

In the electronically controlled braking apparatus as described above, the operation amount (such as a pedal stroke and a tread force) input from the brake pedal is required to be detected with high accuracy. Patent Document 1 mentioned below describes one conventional apparatus for detecting an operation amount of a brake pedal.

In a braking apparatus described in Patent Document 1 mentioned below, a brake pedal has an upper end portion rotatably supported by a vehicle body and a middle portion rotatably connected to an end portion of an input rod via a clevis, and a rotating lever is rotatably arranged and holds a tread-force switch so that an end portion of the rotating lever can push a movable rod of the tread-force switch. An operation of the brake pedal makes the rotating lever rotate and push the movable rod of the tread-force switch, whereby a pedal force can be detected.

Patent Document 1: Japanese Patent Application Laid-Open No. 2000-168532

DISCLOSURE OF INVENTION

Problem to be Solved by the Invention

The conventional apparatus mentioned above which detects the operation amount of the brake pedal in the braking apparatus requires the rotating lever to transmit an operating force of the brake pedal to the tread-force switch, whereby the structure becomes complicated and manufacturing cost increases. In addition, for a highly-accurate detection of the pedal force, high manufacturing accuracy and assembly accuracy of the rotating lever must be secured and mountainability is compromised.

The present invention is made to solve the problems as described above, and an object of the present invention is to provide a pedal operation amount detecting apparatus which has a simplified structure, an improved mountainability, and an improved reliability.

Means for Solving Problem

To solve the problems as described above and to achieve an object, a pedal operation amount detecting apparatus detects a pedal operation amount based on a load applied by a rotating operation of an operating pedal between the operating pedal and a connecting shaft, the connecting shaft connecting the operating pedal and a connecting member connected at an end portion of an operating rod in a rotatable manner, the pedal operation amount detecting apparatus includes a load transfer member that is arranged between a connecting hole of the operating pedal and the connecting shaft and is capable of transferring a load from the operating pedal to the connecting shaft, and a load detecting unit that is arranged on the load transfer member and is capable of transferring the load from the operating pedal and of detecting a compressive load applied by a surface of the load transfer member and one of an inner circumferential surface of the connecting hole and an outer circumferential surface of the connecting shaft.

In the pedal operation amount detecting apparatus of the present invention, the load transfer member is cylindrical in shape, supported by the inner circumferential surface of the connecting hole of the operating pedal with a predetermined gap therebetween, and supported by the outer circumferential surface of the connecting shaft in a slidable manner, and the load detecting unit is attached to an outer circumferential surface of the load transfer member so as to be in close contact with the inner circumferential surface of the connecting hole of the operating pedal.

In the pedal operation amount detecting apparatus of the present invention, the connecting member is a clevis secured at the end portion of the operating rod, and the load transfer member is arranged between two arm portions of the clevis.

In the pedal operation amount detecting apparatus of the present invention, an additional load applying unit that applies an additional load to the load detecting unit is provided.

In the pedal operation amount detecting apparatus of the present invention, the additional load applying unit is an additional load adjusting bolt which is capable of supporting the load transfer member on the inner circumferential surface of the connecting hole of the operating pedal with a predetermined gap therebetween, applying an additional load to the load detecting unit by pressing the load detecting unit to the inner circumferential surface of the connecting hole of the operating pedal via the load transfer member, and adjusting the additional load.

In the pedal operation amount detecting apparatus of the present invention, the additional load adjusting bolt has a hollow formed along an axial direction, and a wire coming from an outside passes through the hollow and is connected to the load detecting unit.

Effect of the Invention

Since the pedal operation amount detecting apparatus of the present invention includes the load transfer member arranged between the connecting hole of the operating pedal and the connecting shaft and capable of transferring the load from the operating pedal to the connecting shaft, and the load detecting unit capable of transferring the load from the operating pedal to the load transfer member and capable of detecting a compressive load applied by the surface of the load transfer member and the inner circumferential surface of the connecting hole or the outer circumferential surface of the connecting shaft, the load detecting unit can be readily attached to the operating pedal through the attachment of the load detecting unit to the load transfer member and the arrangement of the load transfer member between the connecting hole of the operating pedal and the connecting shaft, whereby a simplified structure can be realized through the modularization of the apparatus, and an improved mountainability and reliability can be realized.

EXPLANATIONS OF LETTERS OR NUMERALS

11 Brake pedal (operating pedal)
15 Operating rod
16 Clevis (connecting member)
18 Connecting shaft
21 Connecting hole
22 Bush (Load transfer member)
24, 25, 41 Detector (Load detecting unit)
26, 42 Arithmetic circuit
27, 28, 29, 43, 55 Wire
30, 51 Screw hole
31 Recess
32, 54 Additional load adjusting bolt (Additional load adjusting applying unit)
52 Through hole
53 Pressing member
54a Hollow

BEST MODE(S) FOR CARRYING OUT THE INVENTION

Exemplary embodiments of a pedal operation amount detecting apparatus according to the present invention will be described in detail below with reference to the accompanying drawings. It should be noted, however, that the present invention is not limited by the embodiments.

First Embodiment

Figure 1:
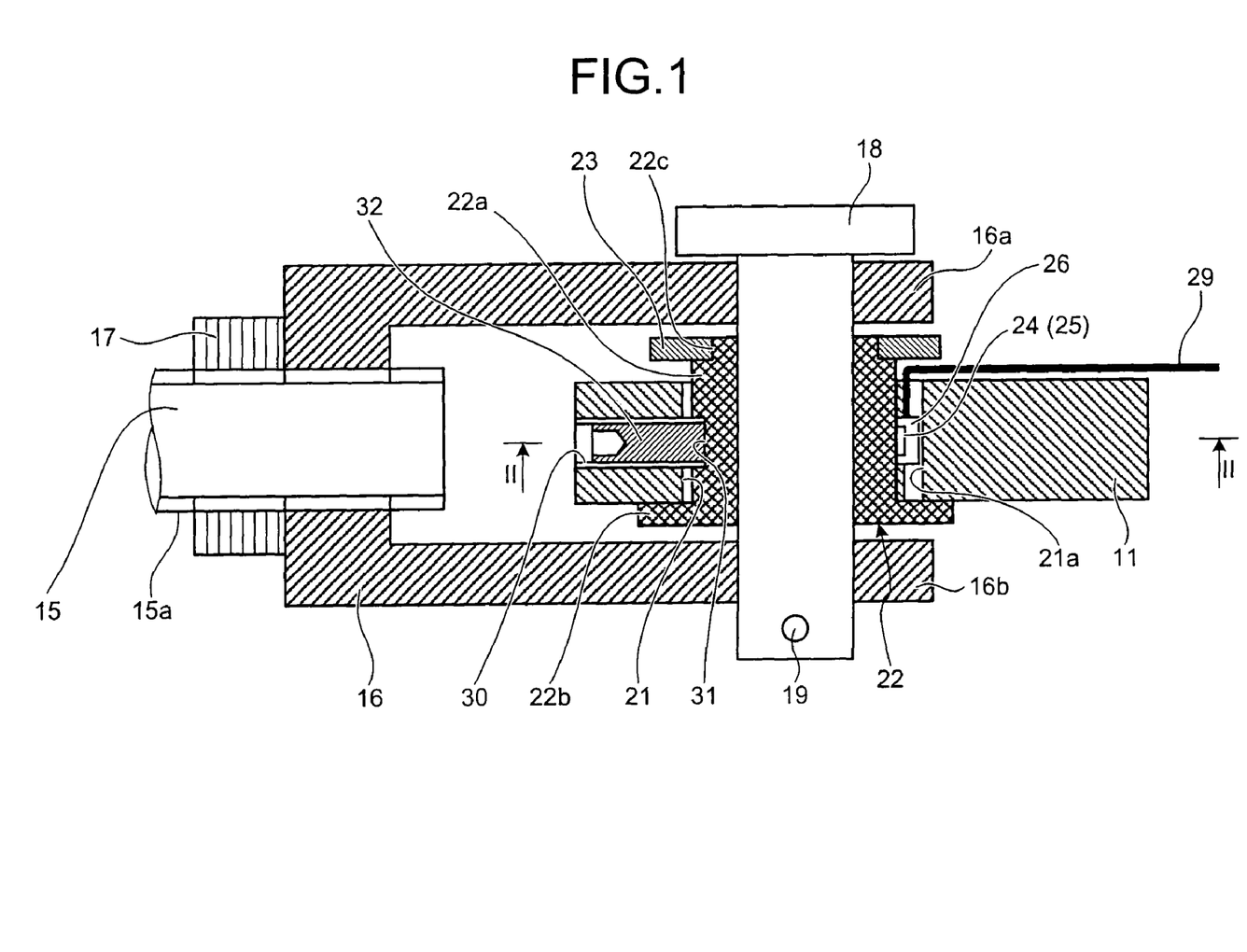
FIG. 1 is a schematic horizontal sectional view (i.e., sectional view along line I-I of FIG. 3) of a pedal operation amount detecting apparatus according to a first embodiment of the present invention.
Figure 2:
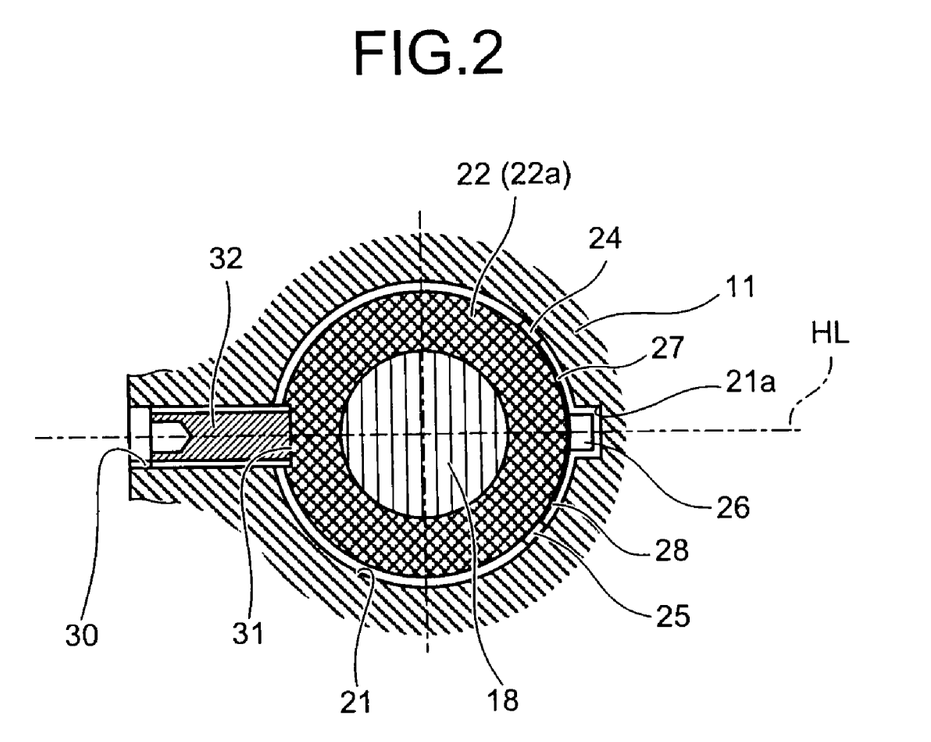
FIG. 2 is a sectional view along line II-II of FIG. 1 showing an arrangement of detectors in the pedal operation amount detecting apparatus according to the first embodiment.
Figure 3:
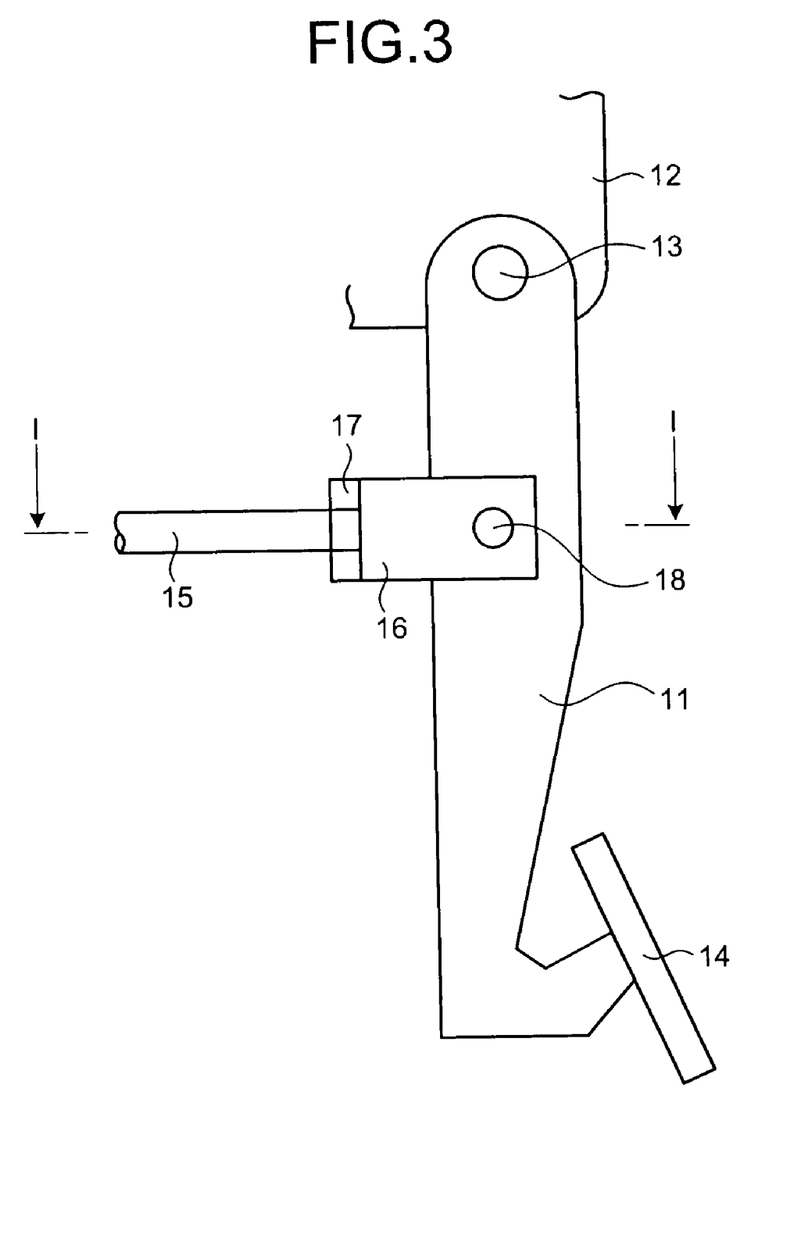
FIG. 3 is a front view of the pedal operation amount detecting apparatus according to the first embodiment.

FIG. 1 is a schematic horizontal sectional view (i.e., sectional view along line I-I of FIG. 3) of a pedal operation amount detecting apparatus according to a first embodiment of the present invention, FIG. 2 is a sectional view along line II-II of FIG. 1 showing an arrangement of detectors in the pedal operation amount detecting apparatus according to the first embodiment, and FIG. 3 is a front view of the pedal operation amount detecting apparatus according to the first embodiment.

In the pedal operation amount detecting apparatus according to the first embodiment as shown in FIGS. 1 to 3, a brake pedal 11 which serves as an operating pedal has an upper end portion rotatably and suspensibly supported by a supporting shaft 13 on an attachment bracket 12 at a side of a vehicle body and a lower end portion to which a pedal 14 is attached in such a manner that a passenger can tread on the pedal 14. On the other hand, an operating rod 15 has a tip end portion which is connected to a master cylinder and a brake booster (not shown) that are operation targets whose operations control a braking apparatus.

Further, the operating rod 15 has a screw portion 15a formed at a proximal end portion. The screw portion 15a is screwed into a clevis 16, while a locknut 17 is screwed onto the operating rod 15 and brought into contact with the clevis 16, whereby a screwed state of the operating rod 15 (screw portion 15a) relative to the clevis 16 is prevented from being loosened. The clevis 16 has arm portions 16a, 16b. The arm portions 16a and 16b are positioned respectively on two sides of a middle portion of the brake pedal 11 with a predetermined distance therebetween. A connecting shaft 18 penetrates through the brake pedal 11 and the two arm portions 16a and 16b, and a retaining pin 19 is fixed at an end portion of the connecting shaft 18, whereby the brake pedal 11 and the clevis 16 are connected with each other in a rotatable manner.

When the passenger treads on the brake pedal 11, the brake pedal 11 rotates around the supporting shaft 13, and an operation amount (operating force) of the brake pedal 11 is transferred to the operating rod 15 via the connecting shaft 18 and the clevis 16. Then, the operating rod 15 moves in an axial direction so that the brake booster and the master cylinder operate.

In the first embodiment, a connecting member of the present invention that is connected to the end portion of the operating rod 15 is configured as the clevis 16.

In the pedal operation amount detecting apparatus according to the first embodiment, the brake pedal 11 and the clevis 16 connected to the end portion of the operating rod 15 are rotatably connected with each other via the connecting shaft 18, and the pedal operation amount is detected based on a load applied by the rotating operation of the brake pedal 11 between the brake pedal 11 and the connecting shaft 18. Further, a load transfer member which can transfer the load applied by the brake pedal 11 to the connecting shaft 18 is arranged between a connecting hole of the brake pedal 11 and the connecting shaft 18, and a load detecting unit which can detect the load is arranged on the load transfer member.

A connecting hole 21 is formed in the middle portion of the brake pedal 11, and has a circular section whose diameter is larger than the outer diameter of the connecting shaft 18. A bush 22 which serves as the load transfer member mentioned above is cylindrical in shape, and includes a bush main body 22a whose inner diameter and outer diameter are uniform along an axial direction, a flange 22b which protrudes outwardly like a ring from one axial end portion of the bush main body 22a, and a notch 22c which is a ring like cutout portion provided at another axial end portion of the bush main body 22a. The outer diameter of the bush main body 22a is slightly smaller than the diameter of the connecting hole 21 of the brake pedal 11.

The bush 22 is arranged in the connecting hole 21 of the brake pedal 11 and a disk-like member 23 having a ring-like shape is fitted to the notch 22c, whereby the bush 22 is supported in the connecting hole 21 of the brake pedal 11 in an undetachable manner. Between the outer circumferential surface of the bush 22 and the inner circumferential surface of the connecting hole 21 of the brake pedal 11, a predetermined gap is formed. Further, the connecting shaft 18 penetrates through the arm portions 16a and 16b of the clevis 16 as well as the bush 22 supported by the brake pedal 11, whereby the inner circumferential surface of the bush 22 can slide against the outer circumferential surface of the connecting shaft 18.

On the outer circumferential surface of an axially middle portion of the bush main body 22a of the bush 22, two detectors 24 and 25 are attached as the load detecting unit mentioned earlier. In the first embodiment, two detectors 24 and 25 are arranged on the outer circumferential surface of the bush main body 22a on an opposite side from a side where the operating rod 15 is connected. The detectors 24 and 25 are arranged in a circumferentially-aligned manner at the same distance away from a horizontal line HL, which extends along the axial direction of the operating rod 15, one to the upward direction and the other to the downward direction. The detectors 24 and 25 can detect a compressive load applied by the outer circumferential surface of the bush main body 22a and the inner circumferential surface of the connecting hole 21 in the brake pedal 11 at different positions along the circumferential direction of the connecting shaft 18. On the outer circumferential surface of the axially middle portion of the bush main body 22a of the bush 22, an arithmetic circuit 26 is attached on the horizontal line HL between the detectors 24 and 25. The arithmetic circuit 26 is connected to the detectors 24 and 25 via wires 27 and 28, respectively, and further, a wire 29 coming from outside is connected to the arithmetic circuit 26. On the inner circumferential surface of the connecting hole 21 of the brake pedal 11, a housing recess 21a for housing the arithmetic circuit 26 is formed along the axial direction.

In the pedal operation amount detecting apparatus according to the first embodiment, an additional load applying unit is provided for applying an additional load to the detectors 24 and 25 that serve as the load detecting unit. Specifically, a screw hole 30 is formed in the brake pedal 11 so as to communicate the connecting hole 21 with an outside at the side where the operating rod 15 is connected, and a recess 31 of substantially the same diameter as the screw hole 30 is formed on the outer circumferential portion of the bush 22 at a position corresponding to the screw hole 30. An additional load adjusting bolt 32 which serves as the additional load applying unit is screwed into the screw hole 30 of the brake pedal 11, and a tip end portion of the additional load adjusting bolt 32 is fitted into the recess 31 of the bush 22 so as to press the bush 22, and thereby bringing the detectors 24 and 25 attached on the outer circumferential surface of the bush 22 into close contact with the inner circumferential surface of the connecting hole 21 without any gaps left therebetween. Thus, the additional load adjusting bolt 32 applies an additional load on the detectors 24 and 25. The additional load applied to the detectors 24 and 25 can be adjusted through the change in a pressing force applied to the bush 22 with the adjustment of an amount of a screwed portion of the additional load adjusting bolt 32.

When the passenger treads on the brake pedal 11 and a load is applied to the bush 22, a load of a reactive force is also applied to the bush 22 from the operating rod 15 via the clevis 16. Therefore, the detectors 24 and 25, being compressed between the inner circumferential surface of the connecting hole 21 of the brake pedal 11 and the outer circumferential surface of the bush 22, can detect the compressive load. The arithmetic circuit 26 calculates an operation amount of the brake pedal 11, in other words, a pedal force, based on the load detected by each of the detectors 24 and 25. Since the additional load is applied to each of the detectors 24 and 25 by the additional load adjusting bolt 32, the arithmetic circuit 26 calculates the pedal force by subtracting the additional load from the compressive load detected by each of the detectors 24 and 25 and finding an average of obtained values or by finding a square mean value of the obtained values.

When the passenger treads on the brake pedal 11, the brake pedal 11 rotates around the supporting shaft 13 in a clockwise direction in FIG. 3 due to the tread force. Then, the tread force is input from the brake pedal 11 to the clevis 16 via the connecting shaft 18, and further the tread force is transferred to the operating rod 15 from the clevis 16, whereby the operating rod 15 advances.

In the above operation, the detectors 24 and 25 are compressed by the tread force input from the brake pedal 11, and detect the compressive load. On the other hand, the arithmetic circuit 26 calculates the pedal force of the brake pedal 11 based on the load detected by each of the detectors 24 and 25.

In the pedal operation amount detecting apparatus according to the first embodiment, the brake pedal 11 and the clevis 16 secured at the end portion of the operating rod 15 are rotatably connected by the connecting shaft 18, the bush 22 is arranged between the connecting hole 21 of the brake pedal 11 and the connecting shaft 18 in a displaceable manner relative to the connecting hole 21, the detectors 24 and 25 are attached to the outer circumferential surface of the bush 22, the detectors 24 and 25 detect the load applied by the rotating operation of the brake pedal 11 between the brake pedal 11 and the connecting shaft 18, and the arithmetic circuit 26 calculates the pedal force based on the load detected by each of the detectors 24 and 25.

When the passenger treads on the brake pedal 11, each of the detectors 24 and 25 is compressed between the inner circumferential surface of the connecting hole 21 of the brake pedal 11 and the outer circumferential surface of the connecting shaft 18 and detects the compressive load, whereas the arithmetic circuit 26 calculates the pedal force based on the compressive load detected by the detectors 24 and 25. Thus, an additional member for transferring the tread force of the brake pedal 11 to the detectors 24 and 25 is not required. In addition, the detectors 24 and 25 and the arithmetic circuit 26 can be temporarily fitted into the bush 22 in advance so as to form a unit (module), and can be fitted into the brake pedal 11 in this unitized (in other words, modularized) state, whereby the structure is simplified and mountainability can be improved. In addition, since the detectors 24 and 25 detect the compressive load applied between the connecting hole 21 of the brake pedal 11 and the outer circumferential surface of the connecting shaft 18, the detectors 24 and 25 directly detect the load transferred from the brake pedal 11 to the connecting shaft 18, whereby a pedal operating force (tread force) can be detected with high accuracy and the reliability can be improved.

Further, the bush 22 is formed in a cylindrical shape and supported on the inner circumferential surface of the connecting hole 21 of the brake pedal 11 with a predetermined gap therebetween. At the same time, the bush 22 is slidably supported on the outer circumferential surface of the connecting shaft 18. Further, the detectors 24 and 25 are attached to the outer circumferential surface of the bush 22 so as to be brought into close contact with the inner circumferential surface of the connecting hole 21 of the brake pedal 11. Thus, the bush 22 on which the detectors 24 and 25 are attached can be easily mounted on the brake pedal 11, and the reliability can be enhanced through the highly accurate detection of the tread force.

Further, since the connecting member is formed as the clevis 16 secured at the end portion of the operating rod 15, and the bush 22 serving as the load transfer member is arranged between the two arm portions 16a and 16b of the clevis, the size of the apparatus as a whole does not increase and the detectors 24 and 25 can be easily mounted.

Still further, the screw hole 30 is formed in the brake pedal 11 so as to communicate the connecting hole 21 with the outside, and the recess 31 is formed on the outer circumferential portion of the bush 22 at the position corresponding to the screw hole 30. The additional load adjusting bolt 32 is screwed into the screw hole 30 so that the tip end portion of the additional load adjusting bolt 32 fits into and presses the recess 31 of the bush 22. Thus, each of the detectors 24 and 25 attached to the outer circumferential surface of the bush 22 can be brought into close contact with the inner circumferential surface of the connecting hole 21 without any gaps therebetween, and the bush 22 is properly supported by the additional load applied to the detectors 24 and 25, whereby the support stiffness can be improved. At the same time, the detectors 24 and 25 can detect the load applied between the brake pedal 11 and the connecting shaft 18 with high accuracy. As a result, cost reduction can be realized.

Further, when the pressing force of the bush 22 is changed through the adjustment of an amount of the screwed portion of the additional load adjusting bolt 32, the additional load applied to the detectors 24 and 25 can be adjusted. Thus, even when there is a fluctuation in manufacturing accuracy, the detectors 24 and 25 can be brought into close contact with the inner circumferential surface of the connecting hole 21 without any gaps therebetween, whereby the high detection accuracy of the detectors 24 and 25 can be secured.

Second Embodiment

Figure 4:
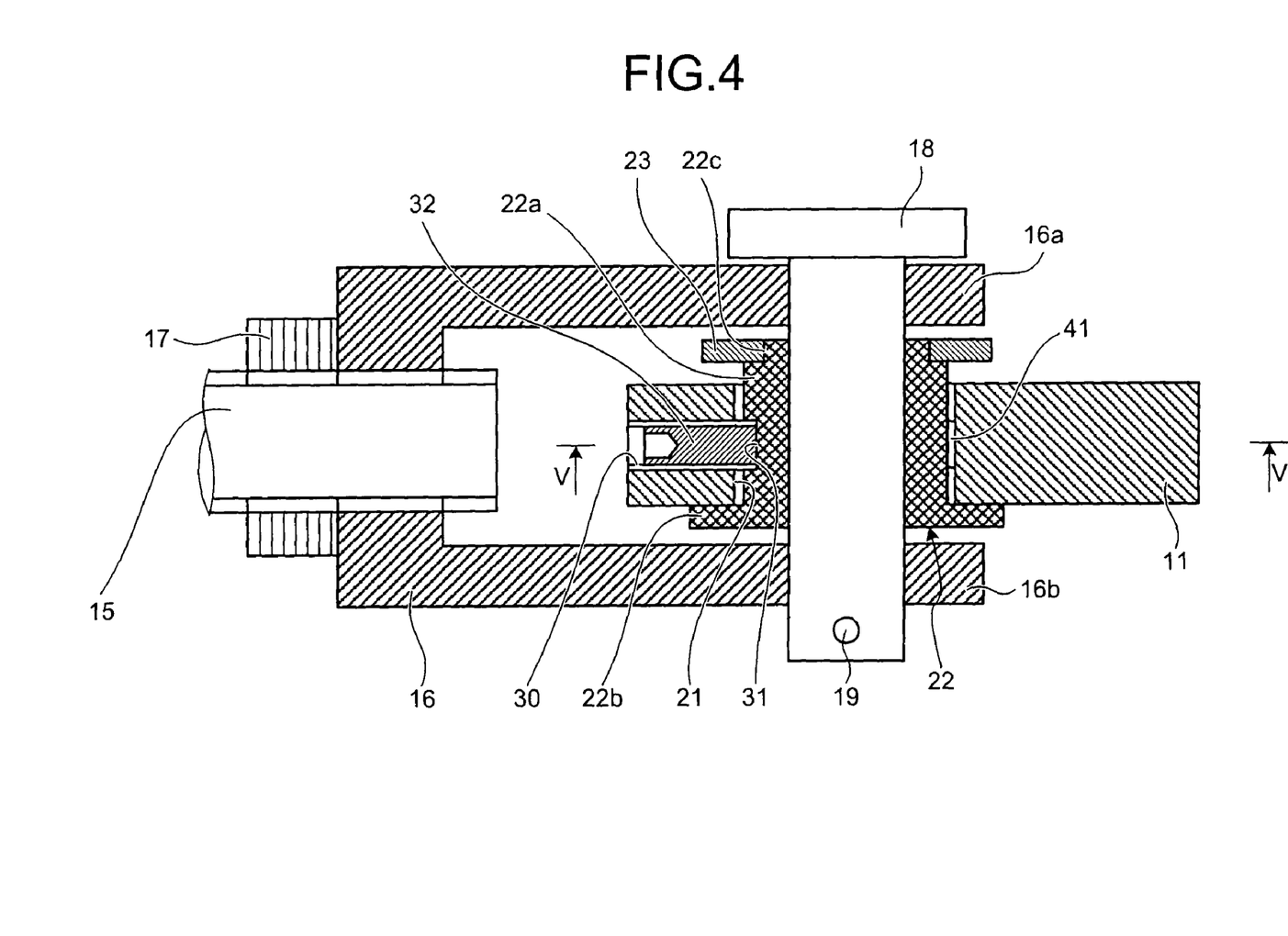
FIG. 4 is a schematic horizontal sectional view of a pedal operation amount detecting apparatus according to a second embodiment of the present invention.
Figure 5:
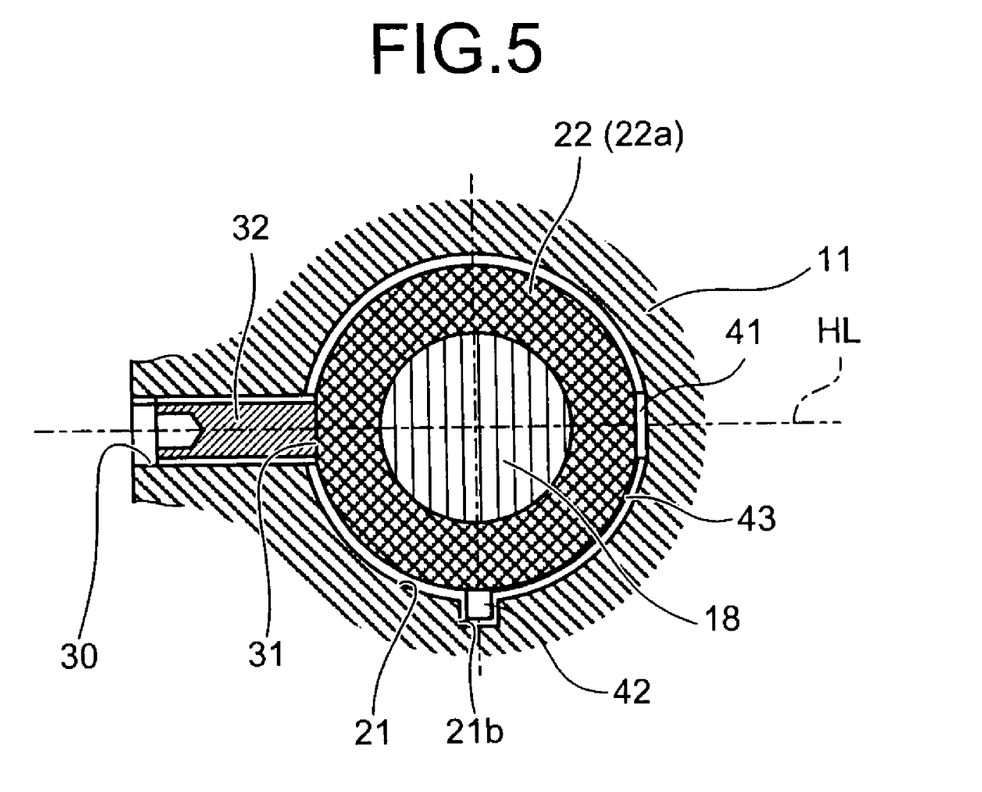
FIG. 5 is a sectional view along line V-V of FIG. 5 showing an arrangement of a detector in the pedal operation amount detecting apparatus according to the second embodiment.

FIG. 4 is a schematic horizontal sectional view of a pedal operation amount detecting apparatus according to a second embodiment of the present invention, and FIG. 5 is a sectional view along line V-V of FIG. 4 showing an arrangement of a detector in the pedal operation amount detecting apparatus according to the second embodiment. Those elements that have the same functions as those described above with reference to the first embodiment will be denoted by the same reference characters and the description thereof will not be repeated.

In the pedal operation amount detecting apparatus according to the second embodiment as shown in FIGS. 4 and 5, the brake pedal 11 is rotatably supported by the supporting shaft 13, and the operating rod 15 has the screw portion 15a screwed into the clevis 16 and secured by the locknut 17. With the connecting shaft 18 penetrating the two arm portions 16a and 16b of the clevis 16 and the brake pedal 11, the brake pedal 11 and the clevis 16 are connected with each other in a rotatably manner.

In the second embodiment, the bush 22 is arranged between the connecting hole 21 of the brake pedal 11 and the connecting shaft 18 as the load transfer member which can transfer the load applied by the brake pedal 11 to the connecting shaft 18, and a detector 41 is arranged on the bush 22 as the load detecting unit which can detect the load.

Specifically, the connecting hole 21 which has a larger diameter than the outer diameter of the connecting shaft 18 is formed in the middle portion of the brake pedal 11. On the other hand, the bush 22 formed in a cylindrical shape has the bush main body 22a whose outer diameter is slightly smaller than that of the connecting hole 21. The bush 22 is arranged in the connecting hole 21 of the brake pedal 11 so that a predetermined gap is formed between the outer circumferential surface of the bush 22 and the inner circumferential surface of the connecting hole 21, and the bush 22 is slidable against the outer circumferential surface of the connecting shaft 18.

A single detector 41 is attached on the outer circumferential surface of an axially middle portion of the bush 22. In the second embodiment, the detector 41 is attached on the outer circumferential surface of the bush main body 22a on the horizontal line HL on the opposite side from the side where the operating rod 15 is connected. Further, an arithmetic circuit 42 is attached on the outer circumferential surface of the axially middle portion of the bush main body 22a approximately 90 degrees apart from the detector 41 downwardly in the circumferential direction. The arithmetic circuit 42 and the detector 41 are connected by a wire 43. On the inner circumferential surface of the connecting hole 21 of the brake pedal 11, a housing recess 21b for housing the arithmetic circuit 42 is formed along the axial direction.

The screw hole 30 communicating the connecting hole 21 with the outside is formed in the brake pedal 11 on the side where the operating rod 15 is connected, while the recess 31 is formed on the outer circumferential portion of the bush 22 at a position corresponding to the screw hole 30. When being screwed into the screw hole 30, the additional load adjusting bolt 32 brings the detector 41 attached on the outer circumferential surface of the bush 22 into close contact with the inner circumferential surface of the connecting hole 21 without any gaps therebetween by pushing the bush 22 with the tip end portion fitted into the recess 31, and thus applying the additional load onto the detector 41. The additional load applied to the detector 41 can be adjusted through the change in the pressing force applied to the bush 22 with the adjustment of an amount of a screwed portion of the additional load adjusting bolt 32.

When the passenger treads on the brake pedal 11, an applied tread force makes the brake pedal 11 rotate around the supporting shaft 13. The tread force is input to the clevis 16 from the brake pedal 11 via the connecting shaft 18, and further is transferred to the operating rod 15 from the clevis 16, whereby the operating rod 15 advances. The detector 41, being compressed by the tread force input from the brake pedal 11, detects the compressive load. The arithmetic circuit 42 calculates the pedal force of the brake pedal 11 based on the load detected by the detector 41.

In the pedal operation amount detecting apparatus according to the second embodiment, the brake pedal 11 and the clevis 16 secured at the end portion of the operating rod 15 are rotatably connected by the connecting shaft 18, the bush 22 is arranged between the connecting hole 21 of the brake pedal 11 and the connecting shaft 18, the detector 41 is attached to the outer circumferential surface of the bush 22, the detector 41 detects the load applied by the rotating operation of the brake pedal 11 between the brake pedal 11 and the connecting shaft 18, and the arithmetic circuit 42 calculates the pedal force based on the load detected by the detector 41.

Thus, when the passenger treads on the brake pedal 11, the detector 41, being compressed between the inner circumferential surface of the connecting hole 21 of the brake pedal 11 and the outer circumferential surface of the connecting shaft 18, detects the compressive load, and the arithmetic circuit 42 calculates the pedal force based on the compressive load detected by the detector 41. Thus, an additional member for transferring the tread force of the brake pedal 11 to the detector 41 is not required. In addition, the detector 41 and the arithmetic circuit 42 can be temporarily fitted into the bush 22 in advance so as to form a unit (module), and can be fitted into the brake pedal 11 in this unitized (i.e., modularized) state. Thus, since the structure can be simplified, the mountainability can be improved. At the same time, since the tread force can be detected with high accuracy, the reliability can be improved.

Third Embodiment

Figure 6:
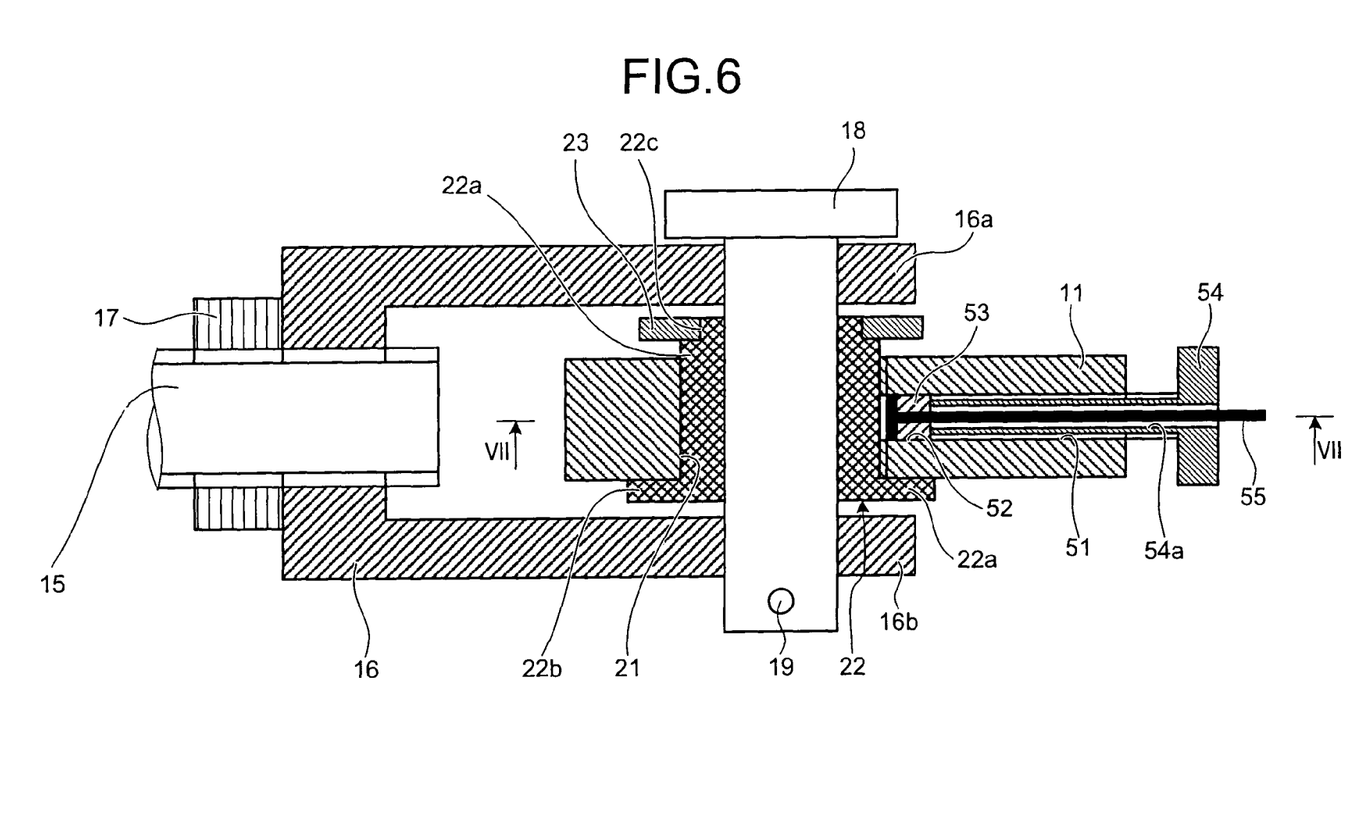
FIG. 6 is a schematic horizontal sectional view of a pedal operation amount detecting apparatus according to a third embodiment of the present invention.
Figure 7:
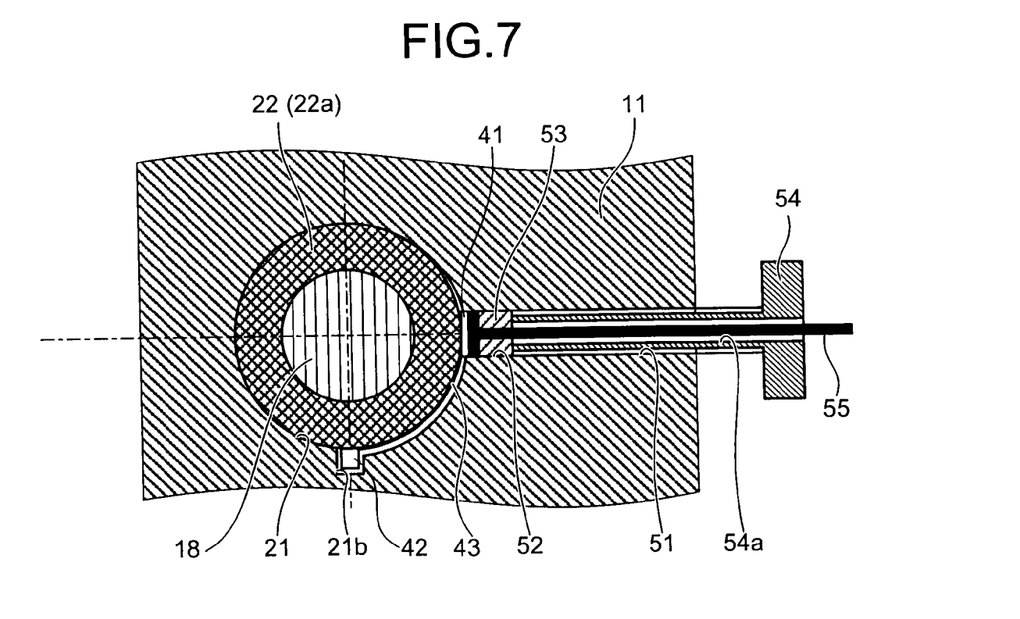
FIG. 7 is a sectional view along line VII-VII of FIG. 6 showing an arrangement of a detector in the pedal operation amount detecting apparatus according to the third embodiment.

FIG. 6 is a schematic horizontal sectional view of a pedal operation amount detecting apparatus according to a third embodiment of the present invention, and FIG. 7 is a sectional view along line VII-VII of FIG. 6 showing an arrangement of a detector in the pedal operation amount detecting apparatus according to the third embodiment. Those elements that have the same functions as those described above with reference to the first and the second embodiments will be denoted by the same reference characters and the description thereof will not be repeated.

In the pedal operation amount detecting apparatus according to the third embodiment as shown in FIGS. 6 and 7, the brake pedal 11 is rotatably supported by the supporting shaft 13, and the operating rod 15 has the screw portion 15a screwed into the clevis 16 and secured by the locknut 17. With the connecting shaft 18 penetrating the two arm portions 16a and 16b of the clevis 16 and the brake pedal 11, the brake pedal 11 and the clevis 16 are connected with each other in a rotatable manner.

In the third embodiment, the bush 22 is arranged between the connecting hole 21 of the brake pedal 11 and the connecting shaft 18 as the load transfer member which can transfer the load applied by the brake pedal 11 to the connecting shaft 18, and further, the detector 41 is arranged on the bush 22 as the load detecting unit which can detect the load. Further, the additional load applying unit is provided for applying an additional load to the detector 41.

Specifically, the connecting hole 21 which has a larger diameter than the outer diameter of the connecting shaft 18 is formed in the middle portion of the brake pedal 11. On the other hand, the bush 22 formed in a cylindrical shape has the bush main body 22a whose outer diameter is slightly smaller than that of the connecting hole 21. The bush 22 is arranged in the connecting hole 21 of the brake pedal 11 so that a predetermined gap is formed between the outer circumferential surface of the bush 22 and the inner circumferential surface of the connecting hole 21, and the bush 22 is slidable against the outer circumferential surface of the connecting shaft 18.

The single detector 41 is attached on the outer circumferential surface of an axially middle portion of the bush 22. In the third embodiment, the detector 41 is attached on the outer circumferential surface of the bush main body 22a on the horizontal line HL on the opposite side from the side where the operating rod 15 is connected. Further, the arithmetic circuit 42 is attached on the outer circumferential surface of the axially middle portion of the bush main body 22a approximately 90 degrees apart from the detector 41 downwardly in the circumferential direction. The arithmetic circuit 42 and the detector 41 are connected by the wire 43.

Further, the additional load applying unit is provided for applying an additional load to the detector 41 in the pedal operation amount detecting apparatus according to the third embodiment. Specifically, a screw hole 51 and a through hole 52 are formed in the brake pedal 11 so as to communicate the connecting hole 21 with the outside at the opposite side from the side where the operating rod 15 is connected. The detector 41 is arranged on the outer circumferential surface of the bush 22 at a position corresponding to the through hole 52. A pressing member 53 is housed in the through hole 52 so as to be in close contact with the surface of the detector 41. An additional load adjusting bolt 54 which serves as the additional load applying unit is screwed into the screw hole 51 of the brake pedal 11, and a tip end portion of the additional load adjusting bolt 54 engages with the pressing member 53 and presses the detector 41 via the pressing member 53, thereby applying an additional load to the detector 41. The additional load applied to the detector 41 can be adjusted through the change in a pressing force applied to the detector 41 with the adjustment of an amount of a screwed portion of the additional load adjusting bolt 54. Further, a hollow 54a is formed in the central portion of the additional load adjusting bolt 54 along the axial direction, and a wire 55 coming from outside runs through the hollow 54a and is connected to the detector 41.

When the passenger treads on the brake pedal 11 and the load is applied to the bush 22, the load of a reactive force is also applied to the bush 22 from the operating rod 15 via the clevis 16. Therefore, the detector 41, being compressed between the inner circumferential surface of the connecting hole 21 of the brake pedal 11 and the outer circumferential surface of the bush 22, can detect the compressive load. The arithmetic circuit 42 calculates an operation amount of the brake pedal 11, in other words, a pedal force, based on the load detected by the detector 41. Since the additional load is applied to the detector 41 by the additional load adjusting bolt 54, the arithmetic circuit 42 calculates the pedal force by subtracting the additional load from the compressive load detected by the detector 41 and finding an average of obtained values or by finding a square mean value of the obtained values.

When the passenger treads on the brake pedal 11, an applied tread force makes the brake pedal 11 rotate around the supporting shaft 13. The tread force is input to the clevis 16 from the brake pedal 11 via the connecting shaft 18, and further is transferred to the operating rod 15 from the clevis 16, whereby the operating rod 15 advances. The detector 41, being compressed by the tread force input from the brake pedal 11, detects the compressive load. The arithmetic circuit 42 calculates the pedal force of the brake pedal 11 based on the load detected by the detector 41.

In the pedal operation amount detecting apparatus according to the third embodiment, the brake pedal 11 and the clevis 16 secured at the end portion of the operating rod 15 are rotatably connected by the connecting shaft 18, the bush 22 is arranged between the connecting hole 21 of the brake pedal 11 and the connecting shaft 18, the detector 41 is attached to the outer circumferential surface of the bush 22, the detector 41 detects the load applied by the rotating operation of the brake pedal 11 between the brake pedal 11 and the connecting shaft 18, and the arithmetic circuit 42 calculates the pedal force based on the load detected by the detector 41.

Thus, when the passenger treads on the brake pedal 11, the detector 41, being compressed between the inner circumferential surface of the connecting hole 21 of the brake pedal 11 and the outer circumferential surface of the connecting shaft 18, detects the compressive load, and the arithmetic circuit 42 calculates the pedal force based on the compressive load detected by the detector 41. Thus, an additional member for transferring the tread force of the brake pedal 11 to the detector 41 is not required. In addition, the detector 41 and the arithmetic circuit 42 can be temporarily fitted into the bush 22 in advance so as to form a unit (module), and can be fitted into the brake pedal 11 in this unitized (i.e., modularized) state. Thus, since the structure can be simplified, the mountainability can be improved. At the same time, since the tread force can be detected with high accuracy, the reliability can be improved.

Still further, the screw hole 51 and the through hole 52 are formed in the brake pedal 11 so as to communicate the connecting hole 21 with the outside, and the detector 41 is arranged on the outer circumferential portion of the bush 22 at a position corresponding to the screw hole 51. The additional load adjusting bolt 54 is screwed into the screw hole 51 so that the tip end portion of the additional load adjusting bolt 54 presses the detector 41 via the pressing member 53. Thus, the detector 41 attached to the outer circumferential surface of the bush 22 can be brought into close contact with the pressing member 53 supported in the connecting hole 21 without any gaps therebetween, and the bush 22 is properly supported by the additional load applied to the detector 41, whereby the support stiffness can be improved. At the same time, the detector 41 can detect the load applied between the brake pedal 11 and the connecting shaft 18 with high accuracy. As a result, cost reduction can be realized.

Further, the additional load applied to the detector 41 can be adjusted through the adjustment of the amount of a screwed portion of the additional load adjusting bolt 54. Thus, even when there is a fluctuation in manufacturing accuracy, the detector 41 can be brought into close contact with the pressing member 53 without any gaps therebetween, whereby the high detection accuracy of the detector 41 can be secured.

Further, the hollow 54a is formed in the middle portion of the additional load adjusting bolt 54 along the axial direction, and the wire 55 from the outside runs through the hollow 54a, and is connected to the detector 41. Therefore, the wire 55 can be easily arranged without any considerations on surrounding elements, whereby the assembly is easily realized and the degree of freedom in design can be increased.

In the embodiments described above, the detectors 24, 25, and 41 are attached on the outer circumferential surface of the bush main body 22a, and detect the compressive load applied by the outer circumferential surface of the bush main body 22a and the inner circumferential surface of the connecting hole 21 of the brake pedal 11. The present invention, however, is not limited to the above configuration. Alternatively, the detectors 24, 25, and 41 may be attached on the inner circumferential surface of the bush main body 22a, and detect a compressive load applied by the inner circumferential surface of the bush main body 22a and the outer circumferential surface of the connecting shaft 18. Further, though one or two of the detectors 24, 25, and 41 are arranged in the above embodiments, the number of the detectors are not specifically limited, and can be determined according to the fitting characteristic, accuracy, and the like as appropriate.

INDUSTRIAL APPLICABILITY

As can be seen from the foregoing, the pedal operation amount detecting apparatus according to the present invention includes the load transfer member arranged between the connecting hole of the operating pedal and the connecting shaft to transfer the load applied by the operating pedal to the connecting shaft, and the load detecting unit provided on the load transfer member. The pedal operation amount is calculated based on the load detected by the load detecting unit. Thus, the apparatus of the present invention realizes simple structure to improve mountainability and the reliability, and is suitable for any pedal operation amount detecting apparatuses.

The invention claimed is:

1. A pedal operation amount detecting apparatus for detecting a pedal operation amount based on a load applied by a rotating operation of an operating pedal between the operating pedal and a connecting shaft, the connecting shaft rotatably connecting the operating pedal and a connecting member connected at an end portion of an operating rod, the apparatus comprising:
   a load transfer member, arranged between a connecting hole of the operating pedal and the connecting shaft, that transfers a load from the operating pedal to the connecting shaft; and
   a load detecting unit, arranged on the load transfer member, that detects a compressive load applied by a surface of the load transfer member and one of an inner circumferential surface of the connecting hole and an outer circumferential surface of the connecting shaft.

2. The pedal operation amount detecting apparatus according to claim 1, wherein
   the load transfer member is cylindrical in shape, supported by the inner circumferential surface of the connecting hole of the operating pedal with a predetermined gap therebetween, and supported by the outer circumferential surface of the connecting shaft in a slidable manner, and
   the load detecting unit is attached to an outer circumferential surface of the load transfer member so as to be in close contact with the inner circumferential surface of the connecting hole of the operating pedal.

3. The pedal operation amount detecting apparatus according to claim 1, wherein
   the connecting member is a clevis secured at the end portion of the operating rod, and
   the load transfer member is arranged between two arm portions of the clevis.

4. The pedal operation amount detecting apparatus according to claim 1, further comprising
   an additional load applying unit that applies an additional load to the load detecting unit.

5. The pedal operation amount detecting apparatus according to claim 4, wherein
   the additional load applying unit is an additional load adjusting bolt which supports the load transfer member on the inner circumferential surface of the connecting hole of the operating pedal with a predetermined gap therebetween, applies an additional load to the load detecting unit by pressing the load detecting unit to the inner circumferential surface of the connecting hole of the operating pedal via the load transfer member, and adjusts the additional load.

6. The pedal operation amount detecting apparatus according to claim 5, wherein
   the additional load adjusting bolt has a hollow formed along an axial direction, and a wire coming from an outside passes through the hollow and is connected to the load detecting unit.

* * * * *